(12) United States Patent
Merryman

(10) Patent No.: US 9,102,544 B2
(45) Date of Patent: Aug. 11, 2015

(54) WASTEWATER TREATMENT SYSTEM

(71) Applicant: BP Corporation North America Inc., Houston, TX (US)

(72) Inventor: Richard S. Merryman, Peabody, MA (US)

(73) Assignee: BP Corporation North America Inc., Warrenville, IL (US)

( * ) Notice: Subject to any disclaimer, the term of this patent is extended or adjusted under 35 U.S.C. 154(b) by 0 days.

(21) Appl. No.: 13/648,059

(22) Filed: Dec. 18, 2012

(65) Prior Publication Data

US 2013/0118982 A1    May 16, 2013

Related U.S. Application Data

(63) Continuation of application No. 12/679,182, filed as application No. PCT/US2008/010885 on Sep. 18, 2008, now abandoned.

(60) Provisional application No. 60/974,006, filed on Sep. 20, 2007.

(51) Int. Cl.

| | |
|---|---|
| B01D 61/00 | (2006.01) |
| B01D 63/00 | (2006.01) |
| C02F 1/44 | (2006.01) |
| C02F 9/00 | (2006.01) |
| B01D 61/04 | (2006.01) |
| B01D 61/58 | (2006.01) |
| B01D 61/02 | (2006.01) |
| B01D 61/14 | (2006.01) |
| C02F 103/28 | (2006.01) |

(52) U.S. Cl.
CPC . *C02F 9/00* (2013.01); *B01D 61/04* (2013.01); *B01D 61/58* (2013.01); *C02F 1/441* (2013.01); *B01D 61/022* (2013.01); *B01D 61/145* (2013.01); *B01D 2311/04* (2013.01); *B01D 2315/10* (2013.01); *B01D 2315/14* (2013.01); *B01D 2317/025* (2013.01); *B01D 2317/04* (2013.01); *B01D 2317/06* (2013.01); *B01D 2317/08* (2013.01); *C02F 1/444* (2013.01); *C02F 2103/28* (2013.01)

(58) Field of Classification Search
CPC .. B01D 61/145; B01D 61/58; B01D 2311/08; B01D 61/025; B01D 2311/25; B01D 61/022; B01D 53/1487; C02F 1/441; C02F 9/00; C02F 1/444; C02F 2209/40; C02F 1/44
USPC ............................ 210/650–651, 195.2, 257.2
See application file for complete search history.

(56) References Cited

U.S. PATENT DOCUMENTS

| | | | |
|---|---|---|---|
| 4,000,065 | A | 12/1976 | Ladha et al. |
| 4,276,176 | A | 6/1981 | Shorr |

(Continued)

OTHER PUBLICATIONS

International Search Report and Written Opinion mailed on Dec. 18, 2008 for PCT application No. PCT/US08/10885.

*Primary Examiner* — Ana Fortuna
(74) *Attorney, Agent, or Firm* — DLA Piper LLP (US)

(57) ABSTRACT

A treatment system and process is described herein to separate constituent parts from aqueous-based products or by-products, such as wastewater from a cellulosic ethanol process. The treatment system may include an ultrafiltration system, a first reverse osmosis system and a second reverse osmosis system. The treatment system may be configured to operate in modified batch mode.

20 Claims, 6 Drawing Sheets

(56) References Cited

U.S. PATENT DOCUMENTS

| | | | |
|---|---|---|---|
| 4,487,989 A * | 12/1984 | Wakefield et al. | 136/256 |
| 5,009,789 A * | 4/1991 | Helmer et al. | 210/641 |
| 5,017,293 A * | 5/1991 | Radovich et al. | 210/646 |
| 5,051,798 A * | 9/1991 | Kimura | 257/229 |
| 5,250,182 A | 10/1993 | Bento et al. | |
| 5,458,781 A * | 10/1995 | Lin | 210/651 |
| 5,635,071 A * | 6/1997 | Al-Samadi | 210/652 |
| 5,685,990 A * | 11/1997 | Saugmann et al. | 210/650 |
| 5,853,593 A * | 12/1998 | Miller | 210/652 |
| 6,113,797 A * | 9/2000 | Al-Samadi | 210/652 |
| 6,120,689 A * | 9/2000 | Tonelli et al. | 210/652 |
| 6,245,121 B1 * | 6/2001 | Lamy et al. | 71/1 |
| 6,461,514 B1 * | 10/2002 | Al-Samadi | 210/652 |
| 6,582,605 B2 * | 6/2003 | Krulik et al. | 210/638 |
| 7,371,319 B2 * | 5/2008 | Wood et al. | 210/85 |
| 7,544,296 B2 * | 6/2009 | Kopf et al. | 210/257.2 |
| 8,070,953 B2 * | 12/2011 | Ito et al. | 210/649 |
| 8,070,955 B2 * | 12/2011 | Ito et al. | 210/652 |
| 8,202,489 B2 * | 6/2012 | Haecker et al. | 422/501 |
| 8,236,178 B2 * | 8/2012 | Ruehr et al. | 210/636 |
| 2003/0094406 A1 * | 5/2003 | Smith | 210/96.2 |
| 2004/0079706 A1 * | 4/2004 | Mairal et al. | 210/651 |
| 2004/0099602 A1 * | 5/2004 | Ogawa et al. | 210/641 |
| 2006/0123563 A1 | 6/2006 | Raney et al. | |
| 2008/0217244 A1 * | 9/2008 | Gaid | 210/636 |
| 2011/0042306 A1 * | 2/2011 | Ito et al. | 210/601 |
| 2011/0049054 A1 * | 3/2011 | Merryman | 210/652 |
| 2011/0147310 A1 * | 6/2011 | Ito et al. | 210/652 |

* cited by examiner

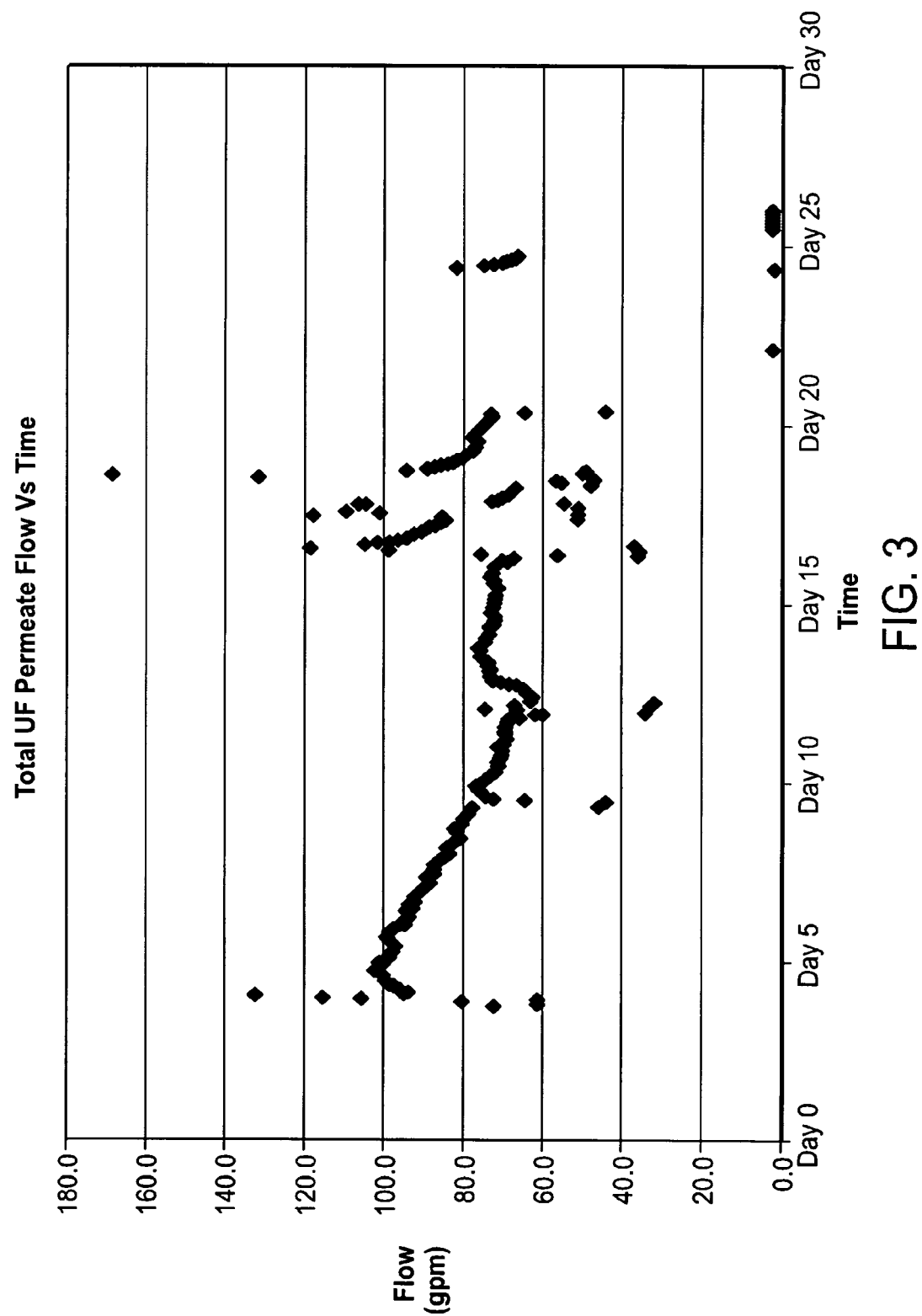

WASTEWATER TREATMENT SYSTEM

RELATED APPLICATIONS

This application claims the benefit of U.S. patent application Ser. No. 12/679,182, filed Nov. 19, 2010, which is a 371 of PCT/US2008/010885, filed Sep. 18, 2008, which designated the U.S. and claims priority to U.S. Provisional Patent Application No. 60/974,006, filed Sep. 20, 2007, the entire contents of which are expressly incorporated herein by reference.

TECHNICAL FIELD

The invention is related generally to treatment systems and processes, including pressure filtration systems, and methods of use.

BACKGROUND

The treatment of wastewater has many potential benefits, one example of which is to achieve an acceptable discharge for disposal or recycle. Processes for the treatment of wastewater include, for example, centrifugation, pressure filtration (e.g., microfiltration, ultrafiltration, nanofiltration, reverse osmosis), membrane distillation, electrolysis, chemical treatments, a combination thereof, etc. In the agricultural and food processing industries, it is known to treat wastewater using pressure filtration processes. Utilizing a combination of pressure filtration processes separates successively smaller particles from resulting permeates. Generally, microfiltration (MF) separates particles between about 0.1 microns and about 10 microns, ultrafiltration (UF) separates particles between about 0.1 to about 0.005 microns, nanofiltration (NF) separates particles between about 0.005 and about 0.001 microns, and reverse osmosis (RO) separates particles that are smaller than about 0.001 microns.

Pressure filtration processes and systems are described, for example, in U.S. Pat. No. 5,250,182, U.S. Patent Application Publication No. US 2005/0252858 and International Patent Application Publication No. WO 2005/123603, each of which is incorporated by reference in its entirety herein.

In a cellulosic ethanol process, including the distillation of ethanol and water fermentation broth, a whole stillage is produced. This whole stillage may be treated to yield a thin stillage. Applicant has recognized it would be desirable to treat whole stillage and/or thin stillage from a cellulosic ethanol process using unique treatment processes in order to separate constituent parts suitable for recycling or discharge. Applicant has also recognized that it would be desirable to treat wastewater from sources other than a cellulosic ethanol process using unique treatment processes to achieve beneficial results. In addition, Applicant has recognized that it would be desirable to operate treatment processes in modified batch mode, rather than in continuous mode, to yield greater water recovery.

SUMMARY

Accordingly, described herein are wastewater treatment systems and processes. As used herein, the term "wastewater" refers to any aqueous-based product or by-product. For example, in one embodiment, the term wastewater refers to any aqueous-based product or by-product in direct or indirect contact with a cellulosic ethanol production process, including any aqueous-based feed stocks such as temulose that may be directly treated in the wastewater process or pretreated before fermentation for enhanced process benefits.

In one aspect, a wastewater treatment process includes sending a volume of initial wastewater from a first receptacle through an ultrafiltration (UF) system to yield a UF permeate, wherein a UF concentrate filtered by the UF system is returned to the first receptacle, feeding the UF permeate into a second receptacle, passing a volume of second receptacle wastewater through a first reverse osmosis (RO) system to yield a first RO permeate, wherein a first RO concentrate filtered by the first RO system is returned to the second receptacle, and moving the first RO permeate through a second RO system to yield a second RO permeate, wherein a second RO concentrate filtered by the second RO system is returned to the second receptacle.

In another aspect, a treatment process includes collecting an aqueous-based by-product and treating the by-product by passing through a treatment system including an UF system, a first RO system, and a second RO system, where the treatment system operates in a modified batch mode.

In one aspect a treatment system to remove solids from wastewater includes a UF system, a first RO system, and a second RO system, wherein a concentrate generated from each of the UF system, the first RO system, and the second RO system are recycled through the system.

In one embodiment, a method of treating wastewater from a cellulosic ethanol process, includes pumping a volume of wastewater, including thin stillage, through an ultrafiltration (UF) system to yield a UF permeate, collecting the UF permeate in a receptacle, pumping a volume of receptacle wastewater through a first reverse osmosis (RO) system to yield a first RO permeate, and pumping the first RO permeate through a second RO system to yield a second RO permeate, wherein concentrates from the UF system, first RO system and second RO system are recycled upstream.

In one aspect, the invention provides a wastewater treatment process, comprising: sending a volume of initial wastewater from a first receptacle through an ultrafiltration (UF) system to yield a UF permeate, wherein a UF concentrate filtered by the UF system is returned to the first receptacle; feeding the UF permeate into a second receptacle; passing a volume of second receptacle wastewater through a first reverse osmosis (RO) system to yield a first RO permeate, wherein a first RO concentrate filtered by the first RO system is returned to the second receptacle; and moving the first RO permeate through a second RO system to yield a second RO permeate, wherein a second RO concentrate filtered by the second RO system is returned to the second receptacle.

In a related embodiment, the process further comprises removing a receptacle concentrate from at least one of the first and second receptacles.

In a related embodiment, the process further comprises recycling the receptacle concentrate for use as a fuel or fertilizer.

In related embodiments, the wastewater is the by-product of a cellulosic ethanol process, constituents of the by-product selected from the group consisting essentially of whole stillage, thin stillage, process wash water, process chemical cleaning solution water, boiler blow down, cooling tower blow down, rain water run off, and combinations thereof.

In a related embodiment, the process further comprises producing thin stillage by treating whole stillage using a centrifugation process.

In a related embodiment, the second RO permeate is substantially free of furfural, organic acids, total dissolved organic and inorganic solids (TDS), and total suspended solids (TSS).

In another related embodiment the analytical composition of the wastewater includes a high concentration of total dissolved organic and inorganic solids (TDS), total organic carbon (TOC), total suspended solids (TSS), carbonaceous biochemical oxygen demand (CBOD), or metals, and combinations thereof.

In another related embodiment, the UF system includes one or more membranes having 1 inch tubes.

In another related embodiment the second RO permeate includes a percentage of water from the initial wastewater in the range of about 90% to about 98%.

In another related embodiment the second RO permeate is of sufficient quality to either be recycled and/or to meet the Louisiana Department of Environmental Quality (LDEQ) standard.

In another aspect, the instant invention provides a treatment process, comprising: collecting an aqueous-based by-product; treating the by-product by passing through a treatment system including an ultrafiltration (UF) system, a first reverse osmosis (RO) system, and a second RO system, the treatment system operating in a modified batch mode.

In a related embodiment the treatment system operates at a rate in the range of about 15 gpm to about 115 gpm.

In another related embodiment the treatment system operates at a temperature in the range of about 40 degrees F. to about 140 degrees F.

In another related embodiment the treatment system operates at a pH in the range of about 2 to about 11.

The treatment process, according to claim 11, wherein the cross flow velocity of the UF system is in the range of about 10 ft/s to about 15 ft/s.

In another related embodiment the by-product is selected from the group consisting essentially of whole stillage, thin stillage, temulose, and combinations thereof.

In another aspect, the invention provides a treatment system to remove solids from wastewater, comprising: an ultrafiltration (UF) system; a first reverse osmosis (RO) system; and a second RO system, wherein a concentrate generated from each of the UF system, the first RO system, and the second RO system are recycled through the system.

In related embodiment, the system further comprises a first receptacle upstream of the UF system and a second receptacle between the UF system and the first RO system.

In another related embodiment, the system further comprises a plurality of pumps configured to transfer wastewater and treated wastewater through the system.

In another aspect, the invention provides a method of treating wastewater from a cellulosic ethanol process, comprising: pumping a volume of wastewater, including thin stillage, through an ultrafiltration (UF) system to yield a UF permeate; collecting the UF permeate in a receptacle; pumping a volume of receptacle wastewater through a first reverse osmosis (RO) system to yield a first RO permeate; and pumping the first RO permeate through a second RO system to yield a second RO permeate, wherein concentrates from the UF system, first RO system and second RO system are recycled upstream.

In related embodiments, the ultrafiltration system or method is capable of retaining 99% of the suspended solids.

In related embodiments, the thin stillage wastewater contains 0.5-3% total suspended solids and 1-3% of dissolved organic compounds In related embodiments, the total organic carbon is less than 50 mg/L, less than 25 mg/L, or less than 10 mg/L.

These and other embodiments, features and advantages will become more apparent to those skilled in the art when taken with reference to the following more detailed description of the invention in conjunction with the accompanying drawings that are first briefly described.

BRIEF DESCRIPTION OF THE DRAWINGS

FIG. 3 depicts a plot of Total UF Permeate Flow vs. Time for the waste water treatment scheme set forth in Example 1.

DETAILED DESCRIPTION

Figure 1:
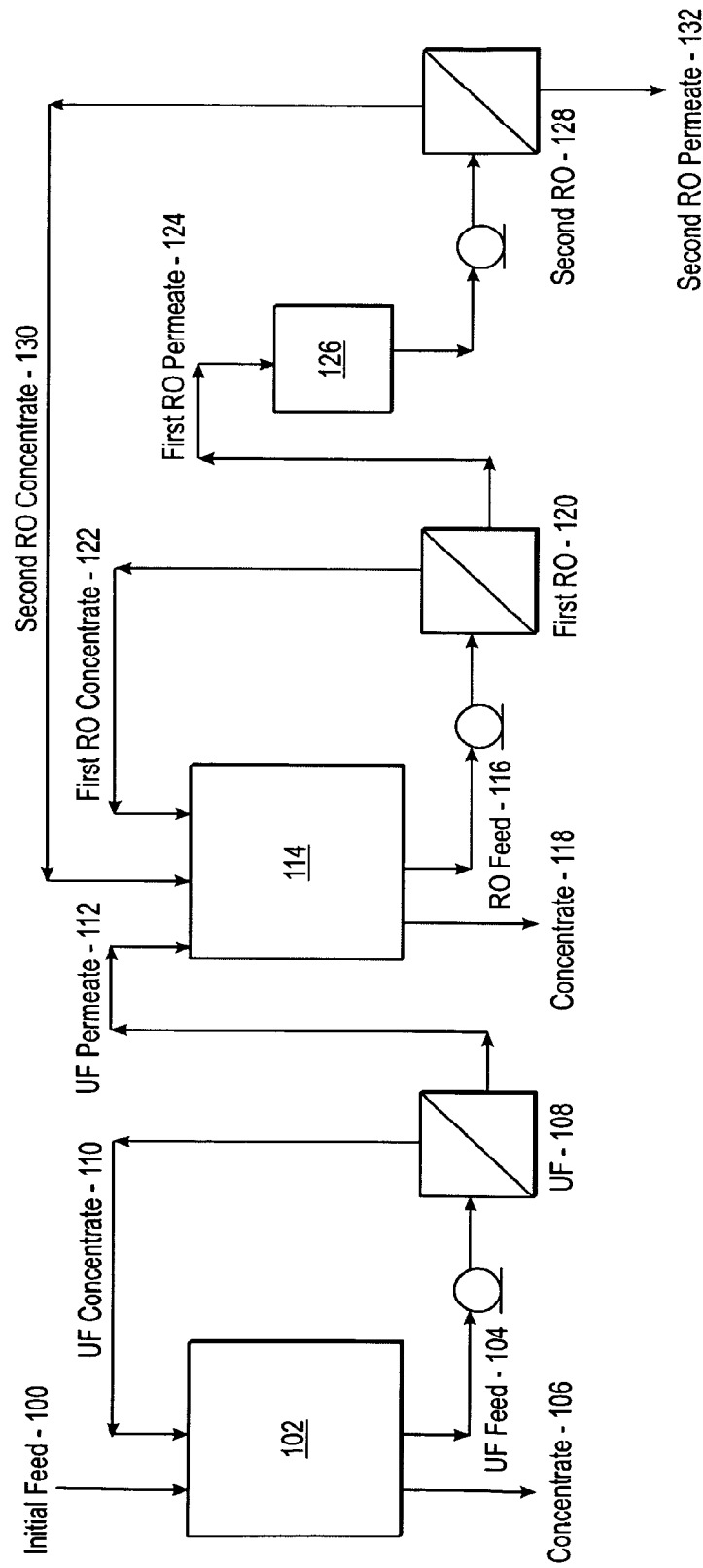
FIG. 1 is a schematic of one embodiment of a wastewater treatment system, including pressure filtration systems.

The following description should be read with reference to the drawings, in which like elements in different drawings are identically numbered. The drawings, which are not necessarily to scale, depict selected embodiments and are not intended to limit the scope of the invention. The description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used herein, the terms "about" or "approximately" for any numerical values or ranges indicate a suitable dimensional tolerance that allows the part or collection of components to function for its intended purpose as described herein.

Although the description of the treatment systems and processes herein is generally with respect to the treatment of wastewater from a cellulosic ethanol process, it should be appreciated that the treatment system and processes described herein may be beneficial for separating constituents from various other aqueous-based products or by-products and/or for preparing feed streams for initial use in a system. For example, the treatment systems and processes described herein may be used to treat temulose sugar for use in a cellulosic ethanol process.

According to one embodiment, a treatment system includes an ultrafiltration (UF) system, a first reverse osmosis (RO) system, and a second RO system. The concentrate generated from each of the UF system, the first RO system, and the second RO system may be recycled through the treatment system such that the treatment system is operated in modified batch mode. The treatment system and process described herein are suitable for processing all by-products of a cellulosic ethanol process, including, for example, whole stillage, thin stillage, process wash water, process chemical cleaning solution water, boiler blow down, cooling tower blow down, and rain water run off. The treatment system and process described herein are also suitable for processing by-products from other processes (e.g., food industry, agricultural industry, etc.) including, for example, by-products from a paper mill process such as temulose. The treatment systems and processes described herein advantageously include combinations of separation processes, such as centrifugation, pressure filtration, membrane distillation, electrolysis, chemical treatments, etc., and/or are utilized to further separate constituents from wastewater initially treated by one or more of these processes.

In one embodiment, the treated wastewater is initially generated from a cellulosic ethanol process, resulting from the distillation of ethanol and water fermentation broth. Whole stillage is generally considered as the remaining water and solids composition after the distillation process. The whole stillage contains a high concentration of suspended solids (e.g., about 2% to about 3%). The whole stillage may then be treated using primary treatment centrifugation to separate the suspended solids. Following centrifugation and the separation out of the suspended solids, the whole stillage becomes thin stillage. Other techniques may alternatively be used to pre-treat the whole stillage, such as pressure filtration, membrane distillation, electrolysis, or chemical treatments. The thin stillage contains some suspended solids and has a high concentration of dissolved organic material. For example, the thin stillage may contain about 50 ppm suspended solids with a high concentration of dissolved organic material (e.g., over 16,000 mg/l TDS), mostly made up of phenolic complex compounds. The phenolic compounds are high in molecular weight and are not easily broken down by biological means. As such, it is desirable to provide a treatment system and process to further treat the thin stillage in order to produce water suitable for recycling through the cellulosic ethanol system and/or the wastewater treatment system or for discharge.

Figure 2A:
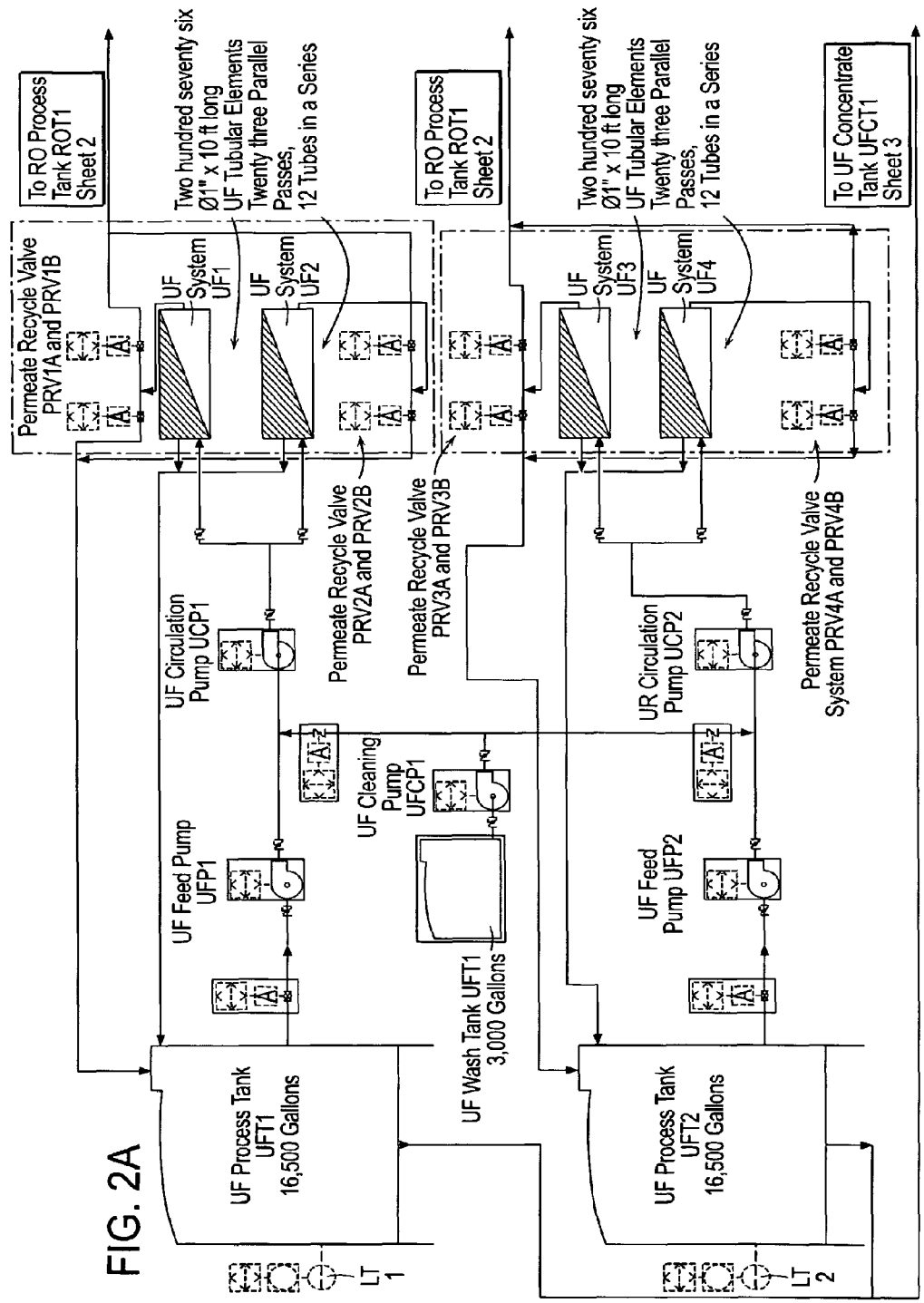
FIG. 2 is a detailed plant design of a wastewater treatment system, including pressure filtration systems, split into sheets A, B, and C.
Figure 2B:
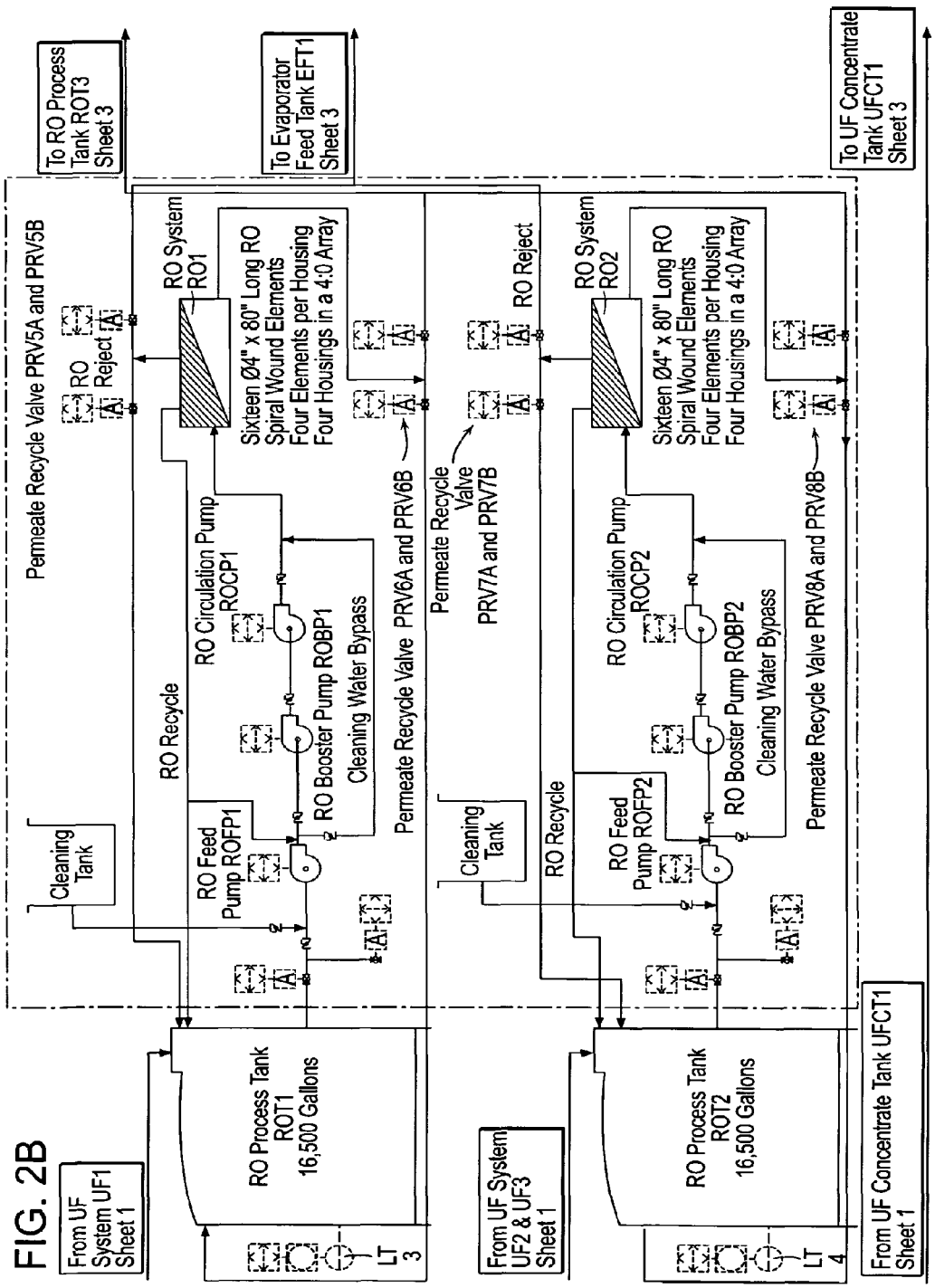
Figure 2C:
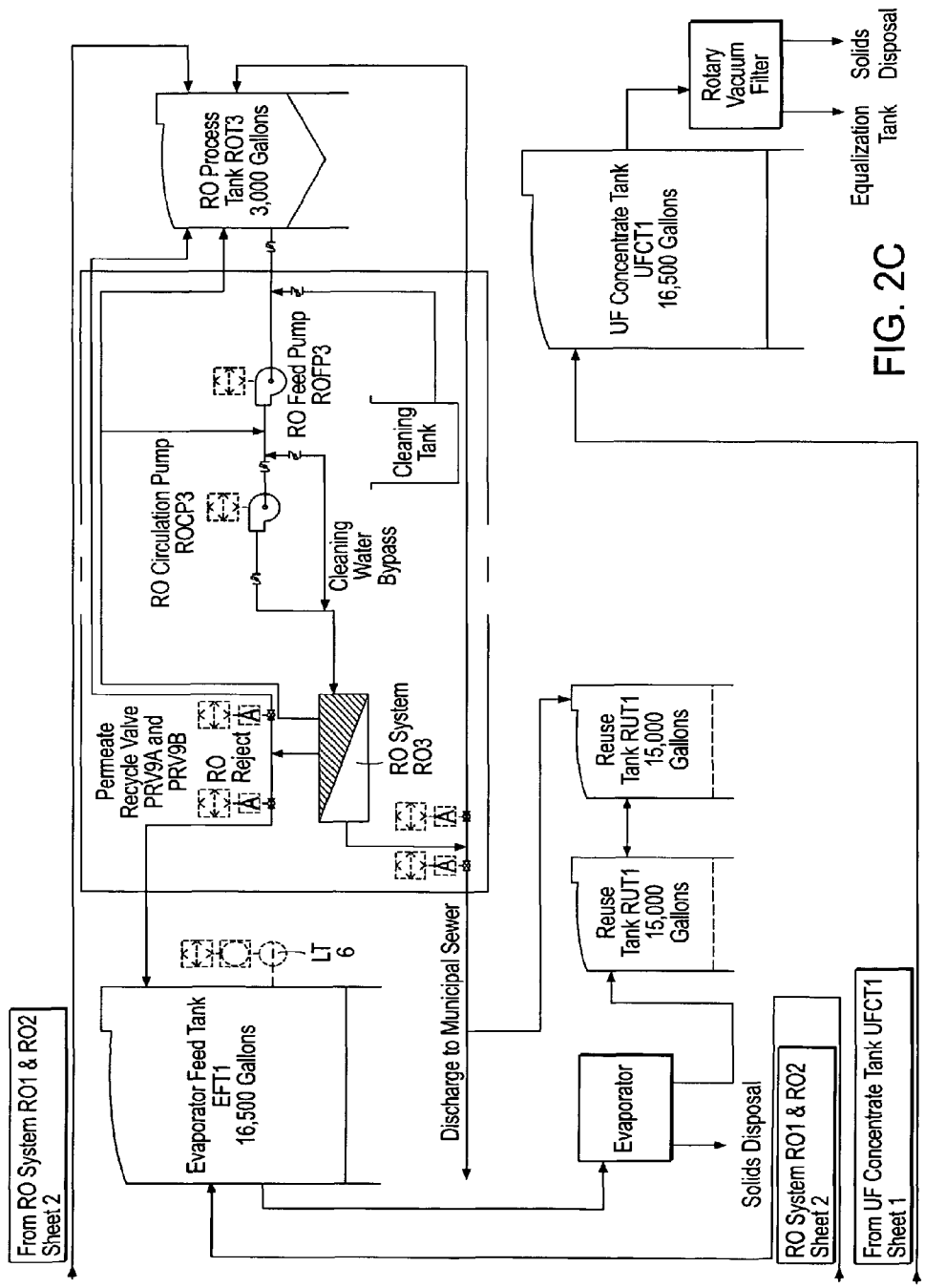

FIG. 1 is a schematic of one embodiment of a wastewater treatment system. FIG. 2, shown on sheets 2A, 2B, and 2C, is a detailed plant design of one embodiment of a wastewater treatment system. Referring to FIG. 1, an initial feed of wastewater 100 is delivered to a first receptacle 102. In one embodiment, the wastewater is the by-product of a cellulosic ethanol process and includes, for example, one or more of: whole stillage, thin stillage, rain water, boiler blow down, cooling tower blow down, washout/flushing water, and CIP cleaning solutions. From the first receptacle 102, an ultrafiltration (UF) feed 104 is pumped through an ultrafiltration (UF) system 108 to yield an ultrafiltration (UF) permeate 112. An ultrafiltration (UF) concentrate 110, filtered by the UF system 108, is returned to the first receptacle 102, and the UF permeate 112 is fed into a second receptacle 114. From the second receptacle 114, a reverse osmosis (RO) feed 116 is pumped through a first reverse osmosis (RO) system 120 to yield a first reverse osmosis (RO) permeate 124. A first reverse osmosis (RO) concentrate 122, filtered by the first RO system, is returned to the second receptacle 114. The first RO permeate 124 is then pumped through a second reverse osmosis (RO) system 128 to yield a second reverse osmosis (RO) permeate 132. A second reverse osmosis (RO) concentrate 130, filtered by the second RO system 128, is returned to the second receptacle 114.

The wastewater 100 treated by the UF system 108 will retain most of the solids, but allows dissolved organic compounds to pass to the second receptacle 114. The recycled UF concentrate 110 is sent back to the first receptacle 102, and the concentrate 106 may be treated using evaporation, chemical treatment or some other method, or be sent to a storage tank and treated by a rotary vacuum pre-coat filter to generate a cake. This substance may be discarded or used for other economic applications, including incineration to generate energy, or land application, such as fertilization. The UF permeate 112, including the water and dissolved organics, is sent to the first RO system 120. The RO concentrate 122 recycled to the second receptacle 114 retains concentrated dissolved organics, and the concentrate 118 may be treated using evaporation, chemical treatment, or some other method, or may be sent through a rotary vacuum filter to generate a cake. The resulting evaporated syrup may be discarded, incinerated for power production, applied to land applications, or used in other economically viable alternatives. In one embodiment, the evaporated syrup is incinerated for power production to run the treatment facility. The permeate 124 from the first RO system is sent to a feed or balance tank 126 for treatment by a second RO system 128. The second RO system further treats the first RO permeate for refined water quality. This results in water that may be recycled back into the plant, and ensures that the water will be of sufficient quality, as set by a state or federal department of environmental control standards, to be discharged into a drain or directly to the environment. However, the quality requirement of the effluent to be recycled may still be refined further if desired.

The UF system 108 is believed to be capable of retaining more than 90% of the suspended solids, but preferably more than 99.5% of the solids, while allowing the majority of the dissolved organic compounds to freely pass through the UF membrane. The UF system may be used in various configurations, including spiral wound, hollow fiber, tubular, plate and frame, and capillary shaped membranes. In one embodiment, the UF membranes are made of polyvinylidene difluoride (PVDF). However, alternative polymeric membranes may be used, such as, for example, polysulphone (PS), polyethylsulphone (PES), polyacrylnitrile (PAN), etc. In one embodiment, the pore size of the PVDF membrane is about 0.05 micron; however, the pore size may be in the range of about 0.001 to about 0.1 micron. Preferably, the UF system uses one or more membranes in polymeric tubes, which provide a benefit of higher concentration of solids and greater water recovery. The tubes may be arranged such that there are multiple separate parallel passes within the system. For example, the UF system may contain multiple one-inch tubes connected in series, but with elements set up in parallel. The UF system may additionally utilize cross-flow filtration, which assists in purifying the wastewater and increases volumetric capacities.

In one embodiment, the UF permeate, water and dissolved organics, will be directed to an RO feed tank for treatment by an RO system to further remove organic compounds. The RO system is designed to retain the dissolved organic constituents while operating at high water recovery of greater than about 90%. The RO system may be used in various configurations, including spiral wound, hollow fiber, tubular, plate and frame, and capillary shaped membranes. In one embodiment, polymeric thin film composite (TFC) membranes ranging in molecule size selectivity are used in the RO system. Alternatively, other polymeric and inorganic membranes and materials of construction may be used. Preferably, the RO system uses spiral wound elements. For example, multiple four-inch or larger diameter spiral wound elements may be used together in a single housing, with multiple housings used in the same RO system. In one embodiment the RO system includes a first and second RO system. The first RO system may yield a concentrated dissolved organic and inorganic reject stream (e.g., in the range of about 1% TDS to about 40% TDS) with a volume less than about 10% of the RO feed stream. This reject stream may be directed to a storage tank for treatment using evaporation for additional de-watering while the evaporator syrup may be disposed of or incinerated for energy. The first RO permeate may be sent to a feed or balance tank for further treatment using a second RO system to provide additional removal of the soluble organic component. The second RO permeate should be of sufficient quality for recycle or discharge.

In one embodiment of the treatment system illustrated in FIG. 1, the system is configured to treat wastewater from a cellulosic ethanol process (e.g., thin stillage, wash water, etc.) at a rate in the range of about 15 gpm to about 115 gpm, with an average of about 65 gpm, at greater than 90% recovery of thin stillage wastewater containing 50 ppm total suspended solids and 1-3% of dissolved organic compounds. However, it should be appreciated that other embodiments of the treatment system described herein will be configured to process greater volumes of wastewater. For example, the addition of one or more systems, such as the system of FIG. 1, run in parallel therewith will increase the volumetric flow rate potential of the system.

In one embodiment, the cross flow velocity within the UF system is in the range of about 10 ft/s to about 15 ft/s, but may operate in the range of about 5 ft/s to about 20 ft/s or more. It is believed that a high cross flow velocity of the UF system will assist in stabilizing the performance of the system. In one embodiment, the UF system will generate less than about 10% of the initial volume feed with a concentrate stream of the suspended solids greater than about 20%. The operating temperature of the system in one embodiment is in the ambient range, generally about 40 degrees F. to about 140 degrees Fahrenheit. However, the temperature may increase from the recirculation pump energy.

A plurality of pumps is configured to transfer wastewater and treated wastewater throughout the system. For example, feed pumps and circulation pumps are used with the UF process system to direct the wastewater treatment flow streams. The RO system may include feed pumps, booster pumps, and circulation pumps to direct the flow streams from these systems. In a preferred embodiment, the pH of the wastewater is maintained in the range of about 5-9 by methods known to one skilled in the art, but the system can operate successfully with wastewater having a pH in the range of about 2 to about 11.

The analytical composition of the wastewater from a cellulosic ethanol process may have an extensive range. The wastewater may be high in total dissolved organic and inorganic solids (TDS), total organic carbon (TOC), total suspended solids (TSS), carbonaceous biochemical oxygen demand (CBOD) and metals. In one embodiment, the greatest water recovery gain from the system includes removal of substantially all of the furfural, organic acids, TSS, and most TDS constituents within the wastewater. Removal of these constituents is believed necessary to prevent the inhibition of propagation or fermentation steps when recycling the treated wastewater into the cellulosic ethanol plant.

An important aspect of the treatment systems and processes described herein is Applicant's discovery of unexpected results from the operation of pressure filtration systems (e.g., UF, RO, etc.) in modified batch mode, as opposed to continuous mode. For example, an ultrafiltration (UF) or reverse osmosis (RO) modified batch (topped off batch) mode process includes feeding wastewater from an equalization tank or balance tank to an ultrafiltration (UF) or reverse osmosis (RO) process tank. The process tank wastewater is fed by pump into the UF or RO system to treat the wastewater. The clean water passes through the UF or RO membrane while the suspended or dissolved solids are retained and sent back to the process tank. As the process tank level reduces, due to the UF or RO system de-watering, a level control indicator built into the process tank provides a signal to the process tank feed pump to turn on and feed wastewater to the UF or RO process tank. Once the process tank full level is achieved a level indicator provides a signal to the feed pump to turn off. This wastewater feed process continues until the UF or RO process tank, over time, builds in concentration of suspended and/or dissolved solids. When the UF and RO systems reach a high level of solids the performance output diminishes and the modified batch mode process is stopped. The UF and RO systems are turned off, the units are cleaned, and the process tank volume is removed. The modified batch process is then repeated. The standard practice in the art is to operate pressure filtration systems in continuous mode in order to eliminate down time and reduce cleaning frequency. However, the overall recovery in a continuous mode is limited to 50-90% in an effort to stabilize output. By operating the pressure filtration systems (e.g., the UF and RO systems of FIG. 1) in modified batch mode, water recovery from initial wastewater was discovered to be in the range of about 95% to about 98%.

This invention has been described and specific examples have been portrayed. While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well. Finally, all publications and patent applications cited in this specification are herein incorporated by reference in their entirety as if each individual publication or patent application were specifically and individually put forth herein.

Exemplification

EXAMPLE 1

Treatment of Waste Water Generated from Cellulosic Ethanol Production

This Example details how wastewater generated from cellulosic ethanol production, e.g., from distillation and fermentation processes, is treated. The water and solids composition that remain after the distillation process is termed "whole stillage". The whole stillage contains a high concentration of suspended solids. The whole stillage is treated by centrifugation, separating the suspended solids, and the whole stillage becomes thin stillage.

Minimal analytical work has been conducted on the thin stillage. However, early analytical results show that the thin stillage contains approximately 0.5-3% suspended solids and has a high concentration of dissolved organic material 1,000-20,000 mg/l mostly made up of phenolic complex compounds. The phenolic compounds are high in molecular weight and are not easily broken down by conventional treatment regimes.

The results of this Example demonstrate that the disclosed methods provide an economical and technically feasible solution to treat the wastewater described above and demonstrate that the treated water can be recycled back into the cellulosic ethanol production process.

The wastewater treatment plant utilized ultrafiltration (UF) and reverse osmosis (RO) technology. The treatment scheme was designed to treat 60 gpm at 90% recovery of thin stillage wastewater containing 0.5-3% total suspended solids and 1-3% of dissolved organic compounds.

The ultrafiltration unit is capable of retaining 99% of the suspended solids while allowing the majority of the dissolved organic compounds to freely pass through the UF membrane.

The UF system generates a concentrated stream of the suspended solids (10-30%), <10% of the initial volume of feed, that was directed towards a storage tank, chemically treated using flocculent, and further treated by a rotary vacuum pre-coat filter to generate a cake.

The UF permeate (water and dissolved organics) was directed to a RO feed tank to be further treated to remove organic compounds. The RO was designed to retain the dissolved organic constituents while operating at high recoveries of 75-90%.

The RO system has concentrated dissolved organic (2-10% TDS) with a flow rate reject stream of 10-25% of the original feed flow. 10-25% of the RO feed stream was directed to a storage tank, chemically treated with flocculent, then further treated using a rotary vacuum filter similar to the UF concentrate.

Figure 4:
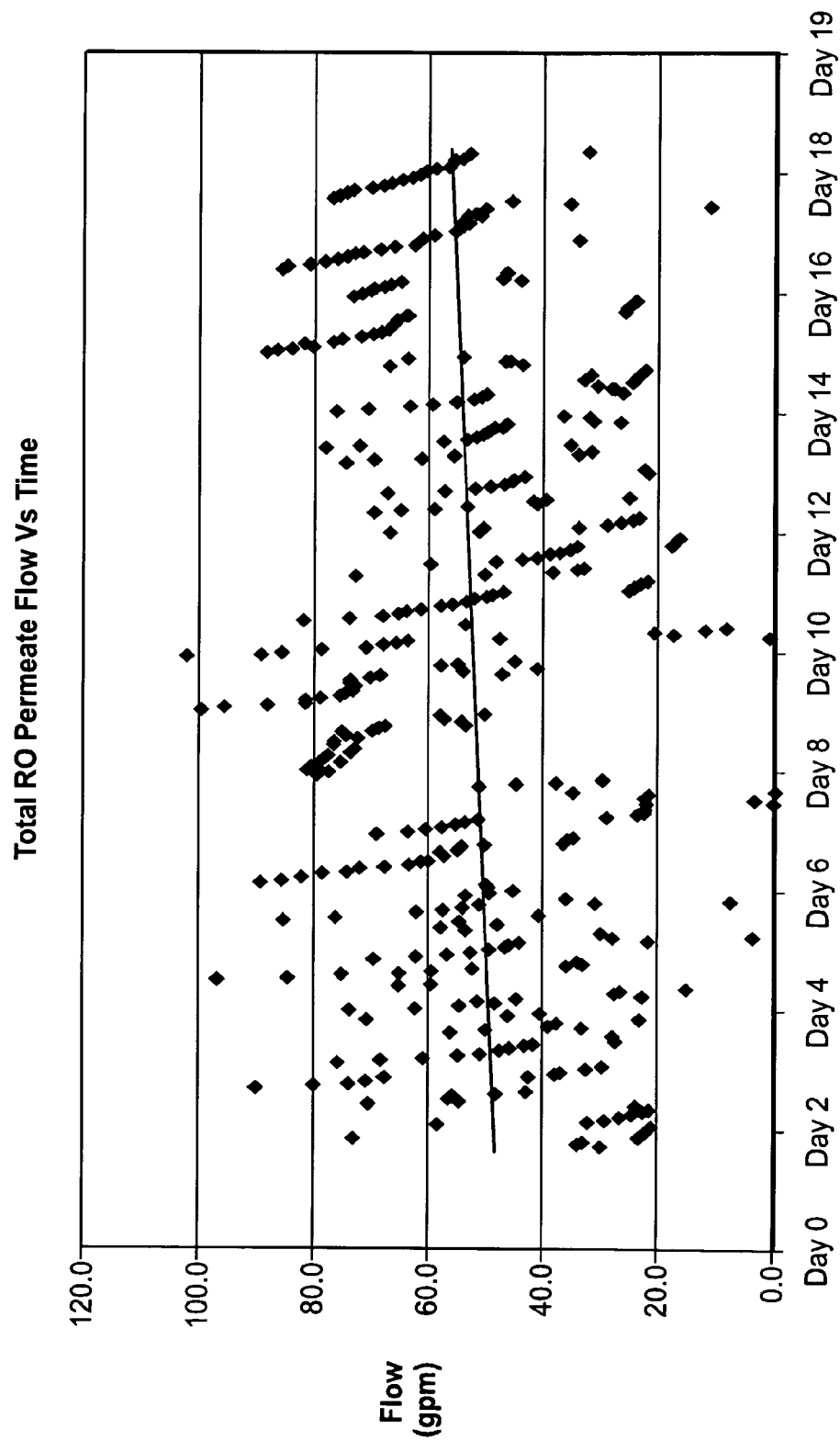
FIG. 4 depicts a plot of Total RO Permeate Flow vs. Time for the waste water treatment scheme set forth in Example 1.

The results of this Example are set forth in Table 1 and FIGS. 3 and 4.

TABLE 1

Analytical Performance Data

| Analysis | UF FEED | RO FEED | RO PERMEATE |
|---|---|---|---|
| pH | 8.52 | 8.27 | 7.98 |
| Calcium Hardness mg/L | 370 | 289 | 6 |
| Magnesium Hardness mg/L | 176 | 178 | 5.7 |
| Iron, as Fe, mg/L | 2.1 | 1.9 | <0.01 |
| Copper, as Cu, mg/L | <0.01 | <0.01 | <0.01 |
| Zinc, as Zn, mg/L | <0.01 | <0.01 | <0.01 |
| Sodium, as Na, mg/L | 385 | 251 | 52 |
| Chloride, as Cl, mg/L | 162 | 162 | 49 |
| Sulfate, as SO4, mg/L | 63 | 63 | 0.49 |
| Nitrate, as NO3, mg/L | <1 | <1.0 | <0.10 |
| Ortho-Phosphate, as PO4, mg/L | 8.6 | 8.6 | <0.5 |
| Silica, as SiO2, mg/L | 68 | 68 | 8.4 |
| Ammonia, as NH3, mg/L | 19 | 19 | 0.052 |
| CBOD mg/L | 215 | | <6 |
| TSS mg/L | 3100 | <1.0 | ND |
| Total Organic Carbon, mg/L | 1140 | 63 | <6 |

Equivalents

Those skilled in the art will recognize, or be able to ascertain using no more than routine experimentation, many equivalents of the specific embodiments of the invention described herein. Such equivalents are intended to be encompassed by the following claims.

Incorporation by Reference

The contents of all references (including literature references, issued patents, published patent applications, and co-pending patent applications) cited throughout this application are hereby expressly incorporated herein in their entireties by reference.

The invention claimed is:

1. A treatment process, comprising:
   collecting an aqueous-based by-product, wherein the by-product comprises members selected from the group consisting essentially of whole stillage, thin stillage, temulose, and combinations thereof; and
   treating the by-product by passage through a treatment system including an ultrafiltration (UF) system, a first reverse osmosis (RO) system, and a second RO system, wherein concentrates generated from the UF system are recycled to a first receptacle and concentrates from the first RO system and the second RO system are recycled to a second receptacle, the treatment system operating in a modified batch mode.

2. The treatment process of claim 1, wherein the treatment system operates at a rate in the range of about 15 gpm to about 115 gpm.

3. The treatment process of claim 1, wherein the treatment system operates at a temperature in the range of about 40 degrees F. to about 140 degrees F.

4. The treatment process of claim 1, wherein the treatment system operates at a pH in the range of about 2 to about 11.

5. The treatment process of claim 1, wherein the cross flow velocity of the UF system is in the range of about 10 ft/s to about 15 ft/s.

6. The treatment process of claim 1, further comprising removing a retentate from at least one of the first and the second receptacles.

7. The treatment process of claim 1, wherein an analytical composition of the aqueous-based by-product includes a high concentration of one or more contaminants selected from the group consisting of a total dissolved organic and inorganic solid (TDS), a total organic carbon (TOC), a total suspended solid (TSS), a carbonaceous biochemical oxygen demand (CBOD), a metal, and combinations thereof.

8. The treatment process of claim 7, wherein the total organic carbon is less than 50 mg/L.

9. The treatment process of claim 7, wherein the total organic carbon is less than 25 mg/L.

10. The treatment process of claim 7, wherein the total organic carbon is less than 10 mg/L.

11. The treatment process of claim 1, wherein the second RO permeate includes a percentage of water from the initial wastewater in the range of about 90% to about 98%.

12. The treatment process of claim 1, further comprising:
    directing recycling the concentrates generated from the UF system or the concentrates from the first RO system and the second RO system for use as a fuel or fertilizer.

13. The treatment process according to claim 1, wherein the second RO permeate is substantially free of one or more contaminates selected from the group consisting of a furfural, an organic acid, a total dissolved organic and inorganic solid (TDS), and a total suspended solid (TSS).

14. The treatment process of claim 1, wherein the ultrafiltration system is capable of retaining 99% of the suspended solids.

15. A method of treating wastewater from a cellulosic ethanol process, comprising:
    pumping a volume of wastewater, including thin stillage, through an ultrafiltration (UF) system to yield a UF permeate;
    collecting the UF permeate in a receptacle;
    pumping a volume of receptacle wastewater through a first reverse osmosis (RO) system to yield a first RO permeate; and
    pumping the first RO permeate through a second RO system to yield a second RO permeate, wherein concentrates from the UF system are recycled to a first receptacle, and concentrates from the first RO system and second RO system are recycled to a second receptacle.

16. The method of claim 15, wherein the thin stillage wastewater contains 0.5-3% total suspended solids and 1-3% of dissolved organic compounds.

17. The method of claim 15, further comprising removing a retentate from at least one of the first and the second receptacles.

18. The method of claim 15, wherein an analytical composition of the volume of wastewater includes a high concentration of one or more contaminants selected from the group consisting of a total dissolved organic and inorganic solid (TDS), a total organic carbon (TOC), a total suspended solid (TSS), a carbonaceous biochemical oxygen demand (CBOD), a metal, and combinations thereof.

19. The method of claim 15, wherein the second RO permeate includes a percentage of water from the initial wastewater in the range of about 90% to about 98%.

20. The method of claim 15, further comprising:
directing recycling the concentrates generated from the UF system or the concentrates from the first RO system and the second RO system for use as a fuel or fertilizer.

* * * * *